US012563522B2

(12) United States Patent
Toft et al.

(10) Patent No.: US 12,563,522 B2
(45) Date of Patent: Feb. 24, 2026

(54) POSITIONING A USER DEVICE

(71) Applicant: Nokia Technologies Oy, Espoo (FI)

(72) Inventors: Morten Toft, Aalborg (DK); Samantha Caporal del Barrio, Aalborg (DK); Johannes Harrebek, Aalborg (DK); Simon Svendsen, Aalborg (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 322 days.

(21) Appl. No.: 18/354,027

(22) Filed: Jul. 18, 2023

(65) Prior Publication Data

US 2024/0049164 A1     Feb. 8, 2024

(30) Foreign Application Priority Data

Aug. 4, 2022    (FI) ..................................... 20225698

(51) Int. Cl.
*H04W 64/00*         (2009.01)
*H04W 74/0833*      (2024.01)

(52) U.S. Cl.
CPC ....... *H04W 64/00* (2013.01); *H04W 74/0833* (2013.01)

(58) Field of Classification Search
CPC .. H04W 74/0833; H04W 64/00; H04L 5/0048
USPC ...................................................... 455/456.1
See application file for complete search history.

(56) References Cited

U.S. PATENT DOCUMENTS

| | | | | |
|---|---|---|---|---|
| 7,110,781 B1 * | 9/2006 | Hulbert | ................. | H04W 64/00 |
| | | | | 370/503 |
| 10,863,473 B2 * | 12/2020 | Wong | ................. | H04W 52/0209 |
| 11,115,103 B2 | 9/2021 | Guo et al. | | |
| 11,683,659 B2 * | 6/2023 | Kim | ..................... | G05D 1/0295 |
| | | | | 455/456.1 |

(Continued)

FOREIGN PATENT DOCUMENTS

| | | |
|---|---|---|
| EP | 4117358 A1 | 1/2023 |
| WO | 2018/028925 A1 | 2/2018 |

(Continued)

OTHER PUBLICATIONS

"Revised SID on Study on expanded and improved NR positioning", 3GPP TSG RAN Meeting #94e, RP-213588, Agenda: 8.6.1, Intel, Dec. 6-17, 2021, 5 pages.

(Continued)

*Primary Examiner* — Qutbuddin Ghulamali
(74) *Attorney, Agent, or Firm* — Carter, DeLuca & Farrell LLP

(57) ABSTRACT

An apparatus (e.g. a user device), method and computer program is described to perform steps including: receiving at a user device, while the user device in is an inactive, unconnected or idle mode, a paging message for positioning determination from one or more of a plurality of network nodes in a radio network; and transmitting, a same group channel preamble message dedicated for positioning determination, to a group of network nodes which are selected by the user device, wherein the same group channel preamble message which being a physical random access channel (PRACH) preamble message, is transmitted under a single random access channel occasion (RO).

1 Claim, 9 Drawing Sheets

(56) References Cited

U.S. PATENT DOCUMENTS

| | | | |
|---|---|---|---|
| 2011/0177814 A1* | 7/2011 | Buchmayer | H04W 48/02 455/435.1 |
| 2020/0229130 A1 | 7/2020 | Keating et al. | |
| 2021/0058971 A1 | 2/2021 | MolavianJazi et al. | |
| 2021/0105833 A1 | 4/2021 | Freda et al. | |
| 2021/0368538 A1 | 11/2021 | Yerramalli et al. | |
| 2022/0061097 A1 | 2/2022 | Kwak et al. | |
| 2022/0167301 A1 | 5/2022 | Goyal et al. | |

FOREIGN PATENT DOCUMENTS

| | | |
|---|---|---|
| WO | 2020/168573 A1 | 8/2020 |
| WO | 2022/006744 A1 | 1/2022 |
| WO | 2022/007719 A1 | 1/2022 |
| WO | 2022/020059 A1 | 1/2022 |
| WO | 2022/031457 A1 | 2/2022 |
| WO | 2022/057997 A1 | 3/2022 |
| WO | 2022/078763 A1 | 4/2022 |
| WO | 2022/081893 A1 | 4/2022 |
| WO | 2023/108377 A1 | 6/2023 |

OTHER PUBLICATIONS

"3rd Generation Partnership Project; Technical Specification Group Services and System Aspects; Service requirements for cyber-physical control applications in vertical domains; Stage 1 (Release 18)", 3GPP TS 22.104, V18.3.0, Dec. 2021, pp. 1-101.

"3rd Generation Partnership Project; Technical Specification Group Radio Access Network; NR; Physical layer procedures for control (Release 17)", 3GPP TS 38.213, V17.1.0, Mar. 2022, pp. 1-245.

"3rd Generation Partnership Project; Technical Specification Group Radio Access Network; NR; Radio Resource Control (RRC) protocol specification (Release 17)", 3GPP TS 38.331, V17.0.0, Mar. 2022, pp. 1-1221.

"3rd Generation Partnership Project; Technical Specification Group Radio Access Network; NG Radio Access Network (NG-RAN); Stage 2 functional specification of User Equipment (UE) positioning in NG-RAN (Release 17)", 3GPP TS 38.305, V17.0.0, Mar. 2022, pp. 1-132.

"3rd Generation Partnership Project; Technical Specification Group Radio Access Network; NR; Physical channels and modulation (Release 17)", 3GPP TS 38.211, V17.1.0, Mar. 2022, pp. 1-135.

"Performance evaluation for beam grouping principles", 3GPP TSG RAN WG1 Meeting #87, R1-1611416, Agenda: 7.1.3.3, ZTE, Nov. 14-18, 2016, 7 pages.

"Provisioning of TRS occasions to Idle/Inactive UEs", 3GPP TSG RAN WG1 #106bis-e, R1-2110137, Agenda: 8.7.1.2, Ericsson, Oct. 11-19, 2021, pp. 1-16.

"Open issues for RRC", 3GPP TSG-RAN WG2 #109 electronic, R2-2002125, Agenda: 6.13.1, Ericsson, Feb. 24-Mar. 6, 2020, pp. 1-13.

"RRM and mobility support", 3GPP TSG RAN WG4 Meeting #80-bis, R4-168037, Agenda: 10.6.1.2, Ericsson, Oct. 10-14, 2016, pp. 1-3.

Pereira et al., "PRACH Power Control Mechanism for Improving Random-Access Energy Efficiency in Long Term Evolution", IEEE 10th Latin-American Conference on Communications (LATINCOM), Nov. 14-16, 2018, 6 pages.

"FL summary #2 for AI 9.5.2.3—low power high accuracy positioning", 3GPP TSG RAN WG1 #109-e, R1-2205354, Agenda: 9.5.2.3, CMCC, May 9-20, 2022, pp. 1-85.

Office action received for corresponding Finnish Patent Application No. 20225698, dated Dec. 22, 2022, 10 pages.

"Potential positioning enhancements", 3GPP TSG RAN WG1 #103-e, R1-2008083, Agenda: 8.5.3, Xiaomi, Oct. 26-Nov. 13, 2020, 5 pages.

Extended European Search Report received for corresponding European Patent Application No. 22188870.4, dated Jan. 27, 2023, 9 pages.

Office action received for corresponding Finnish Patent Application No. 20225698, dated Apr. 25, 2023, 7 pages.

Extended European Search Report received for corresponding European Patent Application No. 23186302.8, dated Jan. 3, 2024, 6 pages.

* cited by examiner

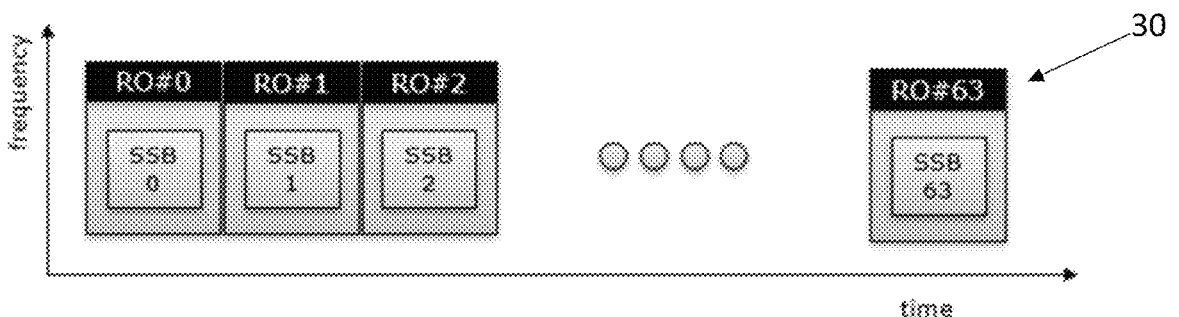
*FIG. 3*
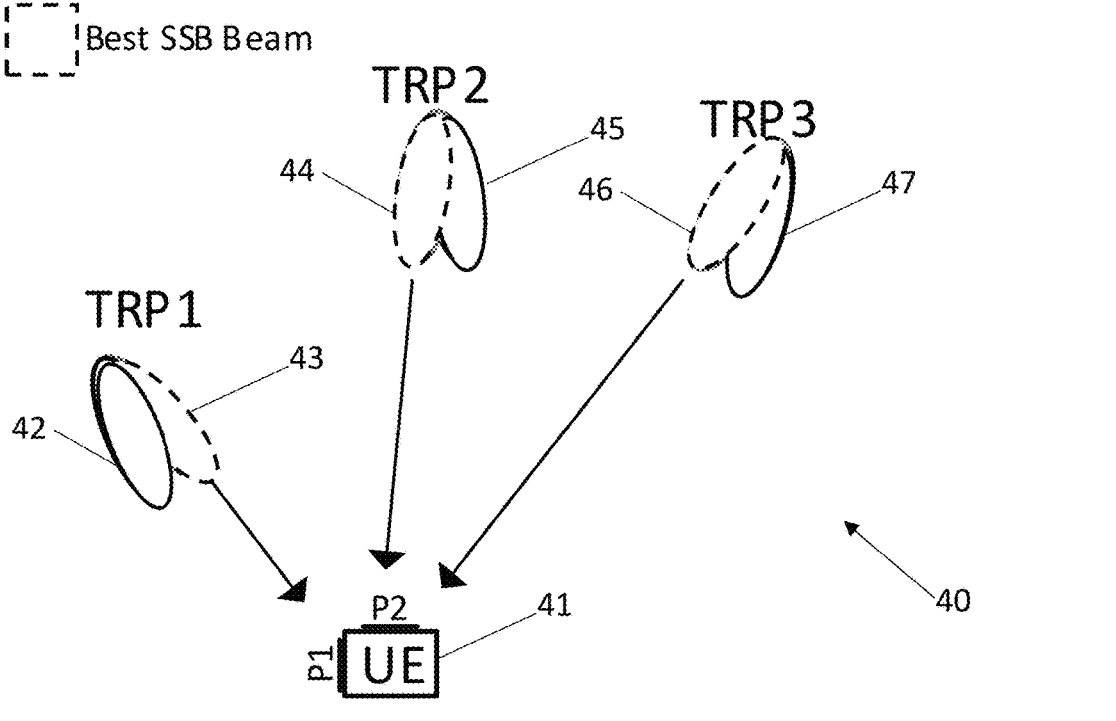
*FIG. 4*
*FIG. 5*

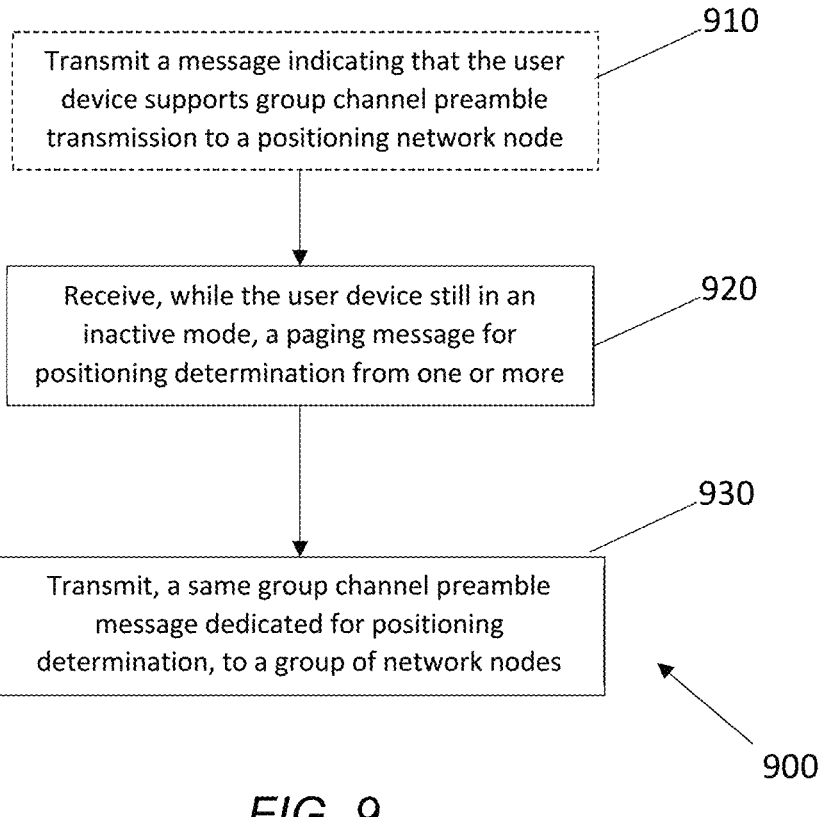

910

Transmit a message indicating that the user device supports group channel preamble transmission to a positioning network node

920

Receive, while the user device still in an inactive mode, a paging message for positioning determination from one or more

930

Transmit, a same group channel preamble message dedicated for positioning determination, to a group of network nodes

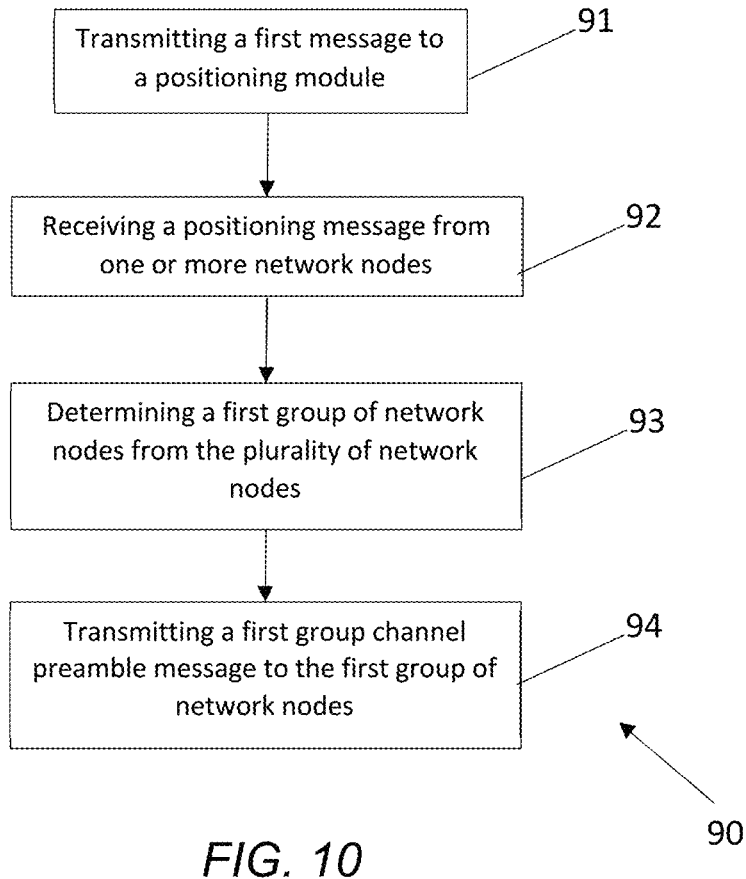

Transmitting a first message to a positioning module — 91

Receiving a positioning message from one or more network nodes — 92

Determining a first group of network nodes from the plurality of network nodes — 93

Transmitting a first group channel preamble message to the first group of network nodes — 94

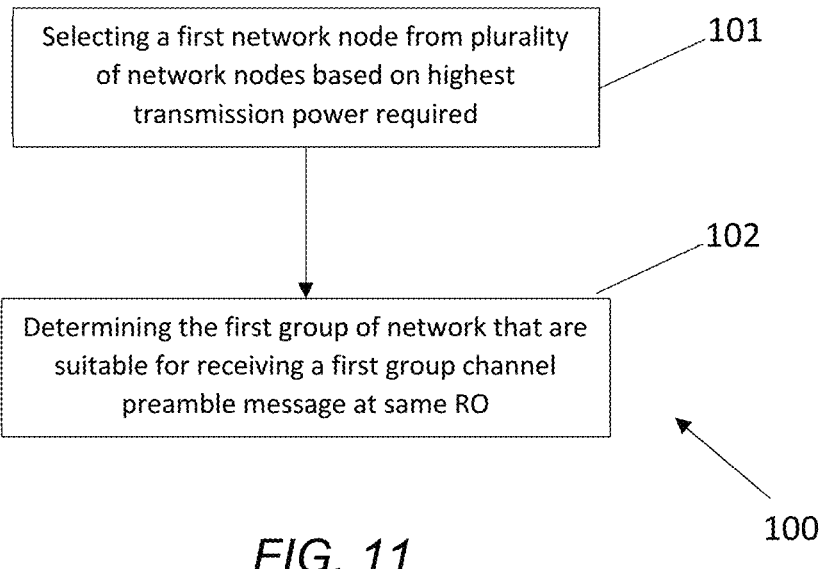

Selecting a first network node from plurality of network nodes based on highest transmission power required — 101

Determining the first group of network that are suitable for receiving a first group channel preamble message at same RO — 102

POSITIONING A USER DEVICE

RELATED APPLICATION

This application claims priority to FI patent application No. 20225698, filed Aug. 4, 2022, and entitled "Positioning a User Device", which is incorporated herein by reference in its entirety.

FIELD

The present relates to obtaining information for determining user device position(s) at a positioning module in a mobile communications system.

BACKGROUND

Arrangements for determining or obtaining positioning information of user devices in a mobile communications environment are known. There remains a need for improvement in how positioning information is obtained.

SUMMARY

In a first aspect, this specification provides a user device, which may include: at least one processor; and at least one memory storing instructions that, when executed by the at least one processor, cause the user device at least to: receive, while the user device still in an inactive, unconnected or idle mode, a paging message for positioning determination from one or more of a plurality of network nodes in a radio network; transmit, a same group channel preamble message dedicated for positioning determination, to a group of network nodes which are selected by the user device from the plurality of network nodes.

In some examples, the group of network nodes are selected within a same spatial filter (e.g. transmission spatial filter) of the user device.

In some examples, prior to the user device receiving the paging message from the one or more of the plurality of network nodes, the user device is caused to transmit a message indicating that the user device supports group channel preamble transmission to a positioning network node.

In some examples, the same group channel preamble message is transmitted under a single random access channel occasion (RO).

In some examples, the same group channel preamble message may include a physical random access channel (PRACH) preamble message.

In some examples, the paging message may include one or more of: a reference signal received power threshold, number of network nodes configured for receiving the group channel preamble message, identity of network nodes configured for receiving the group channel preamble message, expected uplink preamble receiving power.

In a second aspect, this specification provides a positioning module (e.g. such as a location management function (LMF) module) which includes means to: receive a first message (e.g. an initialization message) from a user device (e.g. UE), in a radio network, wherein the first message provides indication that the user device supports group channel preamble message transmission; configure a plurality of network nodes (e.g. base station (gNB) or transmission-reception points (TRP)) in a radio network for receiving a group channel preamble message (e.g. positioning preamble message, such as PRACH preamble message)

from said user device, wherein the plurality of network nodes belong to a network node group; send a location determining information request to said plurality of network nodes; and in response to said location determining information request, receive location determining information from one or more of the plurality of network nodes.

In some examples, the location determining information may include one or more of: respective time of arrival and angle of arrival included in said same group channel preamble message received by respective network nodes transmitted from said user device.

Some examples include determining position of said user device based, at least in part, on the received location determining information.

In some examples, the same group channel preamble message may include a physical random access channel (PRACH) preamble message transmitted from said user device.

In some examples, each of the plurality of network nodes receives from the apparatus, a configuration message which may include a first preamble index (e.g. the first preamble index may be used by said user device for positioning purposes).

In some examples, the same group channel preamble message is received by the plurality of network nodes in the radio network during a single random access channel occasion.

In some examples, the location determining information request may include one or more of a reference signal received power threshold, number of network nodes configured for receiving the group channel preamble message, identity of network nodes configured for receiving the group channel preamble message, and expected uplink preamble receiving power.

The means in the positioning module comprises at least one processor that executes instructions stored in at least one memory to cause the apparatus to perform relevant steps of the apparatus.

In a third aspect, this specification provides an apparatus including one or more network nodes (e.g. such as a base station (gNB) or transmission reception point (TRP)), each having means to: receive respectively, a same group channel preamble message from a user device in a radio network; determine respectively, one or more of a time of arrival and an angle of arrival associated with the first group channel preamble message; and transmit respectively, location determining information to a positioning module, wherein the location determining information may include one or more of the determined time of arrival and angle of arrival to enable the positioning module to determines a position of the user device based on said respectively transmitted location determining information, wherein the positioning module determines a position of the user device based on said respectively transmitted location determining information, wherein the one or more network nodes form a group of network nodes, each receives the same group channel preamble message from the user device at a single random access channel occasion in the radio network. In some examples, the first group channel preamble message may be received in response to a positioning or paging message sent from the one or more network nodes to the user device, or from another network node to the user device.

In some examples, the one or more network nodes is caused to: receive, a configuration message from the positioning module (e.g. location management function (LMF) module); based on the configuration message, perform configuration for receiving one or more group channel preamble messages from a user device; receive a location determining information request from the positioning module; and send a positioning or paging message to the user device based, at least in part, on the received location determining information request.

In a fourth aspect, this specification provides an apparatus which includes means to: transmit a first message to a positioning module (e.g. LMF), wherein the first message provides indication that the user device supports group channel preamble message transmission; receive a positioning or paging message from one or more of a plurality of network nodes (e.g. gNB or TRP); determine a first group of network nodes from the plurality of network nodes that are suitable for receiving a same group channel preamble message; and transmit the same group channel preamble message (e.g. PRACH preamble message) to a first group of network nodes at a first random access channel occasion.

In some examples, the determining the first group of network nodes may include means to: select a first network node from the plurality of network nodes, wherein the first network node is selected based on determining that highest transmission power is required for transmission of a channel preamble message to said first network node in comparison with required transmission power to other ones of the plurality of network nodes; and determine the first group of network nodes, wherein the first group of network nodes are suitable for receiving a first group channel preamble message from the user device during a same random access channel occasion as that of the first network node.

In a fifth aspect, this specification provides a method which includes performing by a user device: receiving at the user device, while the user device in is an inactive, unconnected or idle mode in a radio network, a paging message for positioning determination from one or more of a plurality of network nodes in a radio network; and transmitting, a same group channel preamble message dedicated for positioning determination, to a group of network nodes which are selected by the user device from the plurality of network nodes.

In a sixth aspect, this specification provides a method which includes performing by a positioning module: receiving at the positioning module, a first message from a user device in a radio network, wherein the first message provides indication that the user device supports group channel preamble message transmission; configuring a plurality of network nodes in the radio network for receiving a group channel preamble message (e.g. positioning preamble message, such as PRACH preamble message) from said user device, wherein the plurality of network nodes belong to a network node group; sending a location determining information request to said plurality of network nodes; and in response to said location determining information request, receiving location determining information from one or more of the plurality of network nodes.

In a seventh aspect, this specification provides a method which includes performing by one or more network nodes: receiving respectively, at the one or more network nodes, a same group channel preamble message from a user device in a radio network; determining respectively, one or more of a time of arrival and an angle of arrival associated with the first group channel preamble message; and transmitting respectively, location determining information to a positioning module, wherein the location determining information may include one or more of the determined time of arrival and angle of arrival, wherein the positioning module determines a position of the user device based on said location determining information, wherein the first network node is part of a group of network nodes, wherein the group of network nodes receive the first group channel preamble message from the user device at a single random access channel occasion.

In some examples, the method further may include receiving, at the first network node, a configuration message from the positioning module (e.g. location management function (LMF) module); based on the configuration message, performing configuration for receiving one or more group channel preamble messages from a user device; receiving a location determining information request from the positioning module; and sending the positioning or paging message to the user device based, at least in part, on the received location determining information request.

In an eighth aspect, this specification provides a method for positioning a user equipment, which includes performing by a user device in a radio network: transmitting, a first message to a positioning module, wherein the first message provides indication that the user device supports group channel preamble message transmission; receiving a positioning or paging message from one or more of a plurality of network nodes; determining a first group of network nodes from the plurality of network nodes that are suitable for receiving a same group channel preamble message; and transmitting the same group channel preamble message to a first group of network nodes at a single random access channel occasion.

In a ninth aspect, this specification describes apparatuses configured to perform any method as described with reference to the fifth, sixth, seventh, and eighth aspects.

In a tenth aspect, this specification describes computer-readable instructions which, when executed by computing apparatus, cause the computing apparatus to perform any method as described with reference to the fifth, sixth, seventh, and eighth aspects.

In an eleventh aspect, this specification describes a computer program which includes instructions for causing an apparatus to perform at least the following: receiving at a user device in a radio network, while the user device in is an inactive, unconnected or idle mode, a paging message for positioning determination from one or more of a plurality of network nodes in a radio network; and transmitting, a same group channel preamble message dedicated for positioning determination, to a group of network nodes which are selected from the plurality of network nodes by the user device.

In a twelfth aspect, this specification describes a computer program which includes instructions for causing an apparatus to perform at least the following: receiving at a positioning module, a first message from a user device in a radio network, wherein the first message provides indication that the user device supports group channel preamble message transmission; configuring a plurality of network nodes in the radio network for receiving a group channel preamble message from said user device, wherein the plurality of network nodes belong to a network node group; sending a location determining information request to said plurality of network nodes; and in response to said location determining information request, receiving location determining information from one or more of the plurality of network nodes.

In a thirteenth aspect, this specification describes a computer program which includes instructions for causing an apparatus to perform at least the following: receiving, at a first network node, a same group channel preamble message from a user device; determining one or more of a time of arrival and an angle of arrival associated with the same group channel preamble message; and transmitting location determining information to a positioning module, wherein the location determining information comprises one or more of the determined time of arrival and angle of arrival, wherein the positioning module determines a position of the user device based on said location determining information, wherein the first network node is part of a group of network nodes, wherein the group of network nodes receive the same group channel preamble message from the user device at a single random access channel occasion.

In a fourteenth aspect, this specification describes a computer program which includes instructions for causing a user device to perform at least the following: transmitting a first message to a positioning module, wherein the first message provides indication that the user device supports group channel preamble message transmission; receiving a positioning or paging message from one or more of a plurality of network nodes; determining a first group of network nodes from the plurality of network nodes that are suitable for receiving a same group channel preamble message; and transmitting the same group channel preamble message to a first group of network nodes at a single random access channel occasion.

In a fifteenth aspect, this specification describes a computer-readable medium (such as a non-transitory computer-readable medium) which includes program instructions stored thereon for performing (at least) any method as described with reference to the fifth, sixth, seventh, and eighth aspects.

In a sixteenth aspect, this specification describes an apparatus which includes means to: receive, while the user device still in an inactive, unconnected or idle mode, a paging message for positioning determination from one or more of a plurality of network nodes in a radio network; transmit, a same group channel preamble message dedicated for positioning determination, to a group of network nodes which are selected within a same spatial filter of the user device.

In a seventeenth aspect, this specification describes a positioning module which includes: at least one processor; and at least one memory including computer program code which, when executed by the at least one processor, causes the positioning module to: receive a first message (e.g. an initialization message) from a user device (e.g. UE), wherein the first message provides indication that the user device supports group channel preamble message transmission; configure a plurality of network nodes (e.g. base station (gNB) or transmission-reception points (TRP)) for receiving a group channel preamble message (e.g. PRACH preamble message) from said user device, wherein the plurality of network nodes belong to a network node group; send a location determining information request to said plurality of network nodes; and in response to said location determining information request, receive location determining information from one or more of the plurality of network nodes.

In an eighteenth aspect, this specification describes a network node which includes: at least one processor; and at least one memory including computer program code which, when executed by the at least one processor, causes the network node to: receive at a first network node, a same group channel preamble message from a user device; determine one or more of a time of arrival and an angle of arrival associated with the same group channel preamble message; and transmit location determining information to a positioning module, wherein the location determining information may include one or more of the determined time of arrival and angle of arrival, wherein the positioning module determines a position of the user device based on said location determining information, wherein the first network node is part of a group of network nodes, wherein the group of network nodes receive the same group channel preamble message from the user device at a single random access channel occasion.

In a nineteenth aspect, this specification describes a user device which includes: at least one processor; and at least one memory including computer program code which, when executed by the at least one processor, causes the user device to: transmit a first message to a positioning module (e.g. LMF), wherein the first message provides indication that the user device supports group channel preamble message transmission; receive a positioning or paging message from one or more of a plurality of network nodes (e.g. gNB or TRP) within a group of network nodes; determine a first group of network nodes from the plurality of network nodes that are suitable for receiving a same group channel preamble message; and transmit the same group channel preamble message (e.g. PRACH preamble message) to a first group of network nodes at a single random access channel occasion.

In a twentieth aspect, this specification describes a user device which includes: a first module configured to receive, while the user device still in an inactive, unconnected or idle mode, a paging message for positioning determination from one or more of a plurality of network nodes in a radio network; and a second module configured to transmit, a same group channel preamble message dedicated for positioning determination, to a group of network nodes which are selected by the user device.

In a twenty-first aspect, this specification describes a positioning module which includes: a first module configured to receive a first message (e.g. an initialization message) from a user device (e.g. UE), wherein the first message provides indication that the user device supports group channel preamble message transmission; a second module configured to configure a plurality of network nodes (e.g. base station (gNB) or transmission-reception points (TRP)) for receiving a group channel preamble message (e.g. PRACH preamble message) from said user device, wherein the plurality of network nodes belong to a network node group; a third module configured to send a location determining information request to said plurality of network nodes; and a fourth module configured to, in response to said location determining information request, receive location determining information from one or more of the plurality of network nodes.

In a twenty-second aspect, this specification describes a network node which includes: a first module configured to receive at a first network node, a same group channel preamble message from a user device; a second module configured to determine one or more of a time of arrival and an angle of arrival associated with the same group channel preamble message; and a third module configured to transmit location determining information to a positioning module, wherein the location determining information may include one or more of the determined time of arrival and angle of arrival, wherein the positioning module determines a position of the user device based on said location determining information, wherein the first network node is part of a group of network nodes, wherein the group of network nodes receive the first group channel preamble message from the user device at a single random access channel occasion.

In a twenty-third aspect, this specification describes a user device which includes: a first module configured to transmit a first message to a positioning module (e.g. LMF), wherein the first message provides indication that the user device supports group channel preamble message transmission; a second module configured to receive a positioning or paging message from one or more of a plurality of network nodes (e.g. gNB or TRP); a third module configured to determine a first group of network nodes from the plurality of network nodes that are suitable for receiving a first group channel preamble message; and a fourth module configured to transmit a first group channel preamble message (e.g. PRACH preamble message) to a first group of network nodes at a first random access channel occasion.

BRIEF DESCRIPTION OF THE DRAWINGS

Example embodiments will now be described, by way of example only, with reference to the following schematic drawings, in which:

FIG. 3 is an illustration of an example time-frequency plot;

FIG. 4 is a block diagram of a system in accordance with an example embodiment;

FIG. 5 is an illustration of an example plot for sending channel preamble messages;

FIGS. 8 to 12 are flowcharts of algorithms in accordance with example embodiments;

DETAILED DESCRIPTION

Figure 1:
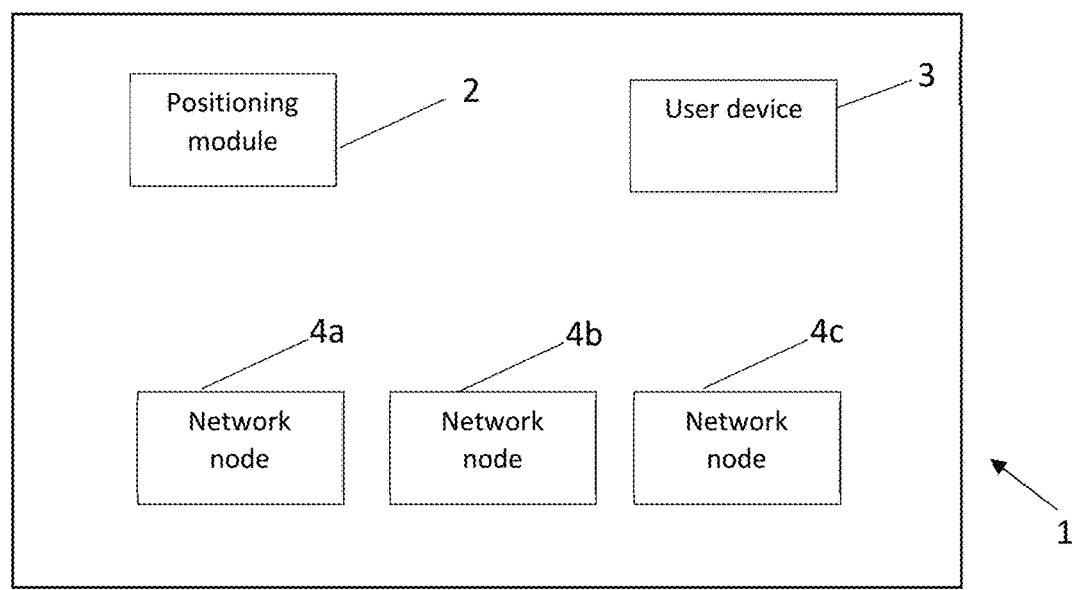
FIGS. 1 and 2 are block diagrams of systems in accordance with example embodiments.

The scope of protection sought for various embodiments of the invention is set out by the independent claims. The embodiments and features, if any, described in the specification that do not fall under the scope of the independent claims are to be interpreted as examples useful for understanding various embodiments of the invention.

In the description and drawings, like reference numerals refer to like elements throughout.

FIG. 1 is a block diagram of a system, indicated generally by the reference numeral 1, in accordance with an example embodiment. System 1 may include a positioning module 2 (e.g. a location management function (LMF) module), a user device 3 (e.g. user equipment (UE)), and a plurality of network nodes 4 (e.g. network nodes 4a, 4b, and 4c; e.g. base stations (gNB)). The system 1 may be a mobile communications system (e.g. 5G network system), where positions of user devices, such as the user device 3, may be determined by positioning module 2, for example in order to enable efficient use of network resources.

By way of example, in 3GPP 5G NR (3rd Generation Partnership Project 5G, New Radio) standards, one or more of the following parameters may be used for determining UE positions: Downlink Time Difference of Arrival (DL-TDOA); Uplink Time Difference of Arrival (UL-TDOA); Downlink Angle of Departure (DL-AoD); Uplink Angle of Arrival (UL-AoA); Multi-cell Round Trip Time (Multi-RTT).

Figure 2:
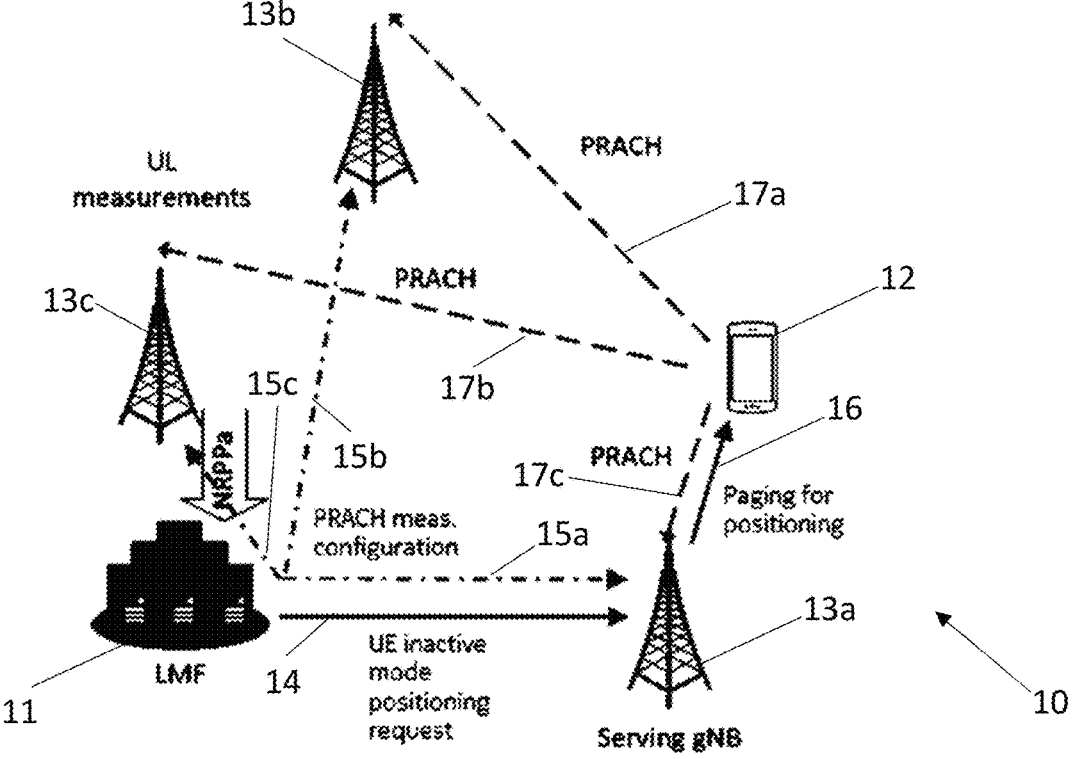

FIG. 2 is a block diagram of a system, indicated generally by the reference numeral 10, in accordance with an example embodiment. System 10 may include a location management function LMF) module 11, a user device 12, and a plurality of base stations (gNB) 13a, 13b, and 13c. The system 10 may be used for positioning (e.g. uplink positioning) of user devices, such as user device 12, that are in idle, unconnected or inactive state (e.g. radio resource control (RRC) idle and RRC inactive UEs). In another example, the user device may be in connected state. A preamble of random access channel (PRACH) may be used as an uplink positioning signal for idle and/or inactive UEs. For example, the LMF module 11 may send a request to a serving gNB 13a for UE positioning for UE 12 in idle and/or inactive mode, as shown by the arrow 14. The LMF module 11 may further send PRACH configuration messages to the plurality of gNBs 13a, 13b, and 13c, as shown by the arrows 15a, 15b, and 15c respectively. The serving gNB 13a may then page the UE 12 for positioning (e.g. idle/inactive mode positioning), as shown by the arrow 16. In response to the paging, the UE 12 may send PRACH messages to the plurality of gNBs 13a, 13b, and 13c, as shown by the arrows 17a, 17b, and 17c respectively. The gNBs 13a, 13b, and 13c may then measure one or more of the parameters such as time of arrival (TOA), angle of arrival (AOA), or the like based on the received PRACH messages, and report the measurements to the LMF 11. The LMF 11 may then perform positioning estimate for the UE 12 based on the measurement reports received from the gNBs.

In some examples, a UE, such as the UE, 12 may measure the reference signal received power (RSRP) of the beams in synchronization signal (SS) burst, decode cell-specific information, and initiate initial access procedure by triggering random access (RA) transmission over the best measured synchronization signal block (SSB) beam (or by selecting one of the SSBs above a RSRP threshold). The RA preamble transmission may take place over a physical Random Access Occasion (RO) and corresponding Random Access Channel (RACH) configuration. By detecting which random access occasion the UE is transmitting onto, the network (e.g. LMF 11) may determine which SSB Beam has been selected by the UE.

The above-mentioned RO may be a resource specified in time and frequency domains available for the transmission of RACH preamble. For example, in 3GPP new radio (NR/5G), SSB indices are associated with ROs via higher-layer signalling. Mapping may be flexible in order to accommodate different network deployments and loads. For example, the mapping between SSB and RO may be defined by one or more parameters such as SSB-perRACH-Occasion and code block (CB)-PreamblePerSSB which may specify the number of SSBs mapped to one RO and the number of preamble indices associated with a single SSB; and msg1-FDM which specifies the number of ROs in frequency domain. Regardless of how the mapping is configured, upon reception of the cell-specific RACH configuration, each UE may determine which preambles can be chosen for transmission in which RO, when the selection of an SSB beam has been performed. The gNB can then perform preamble reception and detection in order to report measurement results to the LMF.

FIG. 3 is an illustration, indicated generally by the reference numeral 30, of an example time-frequency plot. The illustration 30 shows an example of mapping between a synchronization signal (SS)/physical broadcast channel (PBCH) block index (SSB) and PRACH occasion (RO).

A UE (such as the UE 12) may select PRACH occasion based on the best SS/PBCH received from the base station (e.g. gNB or transmission-reception point (TRP)) (e.g. as described in 3GPP 38.213 section 8.1 "Random access preamble"). This is to ensure that the gNB will have its receiver (RX) PRACH narrow beam pointing in the direction of the UE, when the UE is sending the PRACH preamble. There can be up to 64 SS/PBCH block indexes. If a UE is receiving the best signal (e.g. best RSRP/RSRQ) from a TRP on the SSBx, the UE is supposed to use the RO #x for any PRACH preamble transmission.

When the UE is transmitting the uplink (UL) PRACH preamble to the TRP, the transmit power may be defined by an open loop power control (e.g. as defined in 3GPP 38.213 sec. 7.4). It defines the UL power level to be depending on the pathloss estimated by the UE. The UL power may compensate for the pathloss estimated on the channel, and hence the target power received at the TRP may be independent of the distance between the TRP and the different UEs sending the PRACH preamble preambleInitialReceivedTargetPower. The higher pathloss estimated (lower measured RSRP), the higher UL transmit power.

In some examples, the time (RACH Occasion (RO)) when the UE transmits PRACH preamble may depend on which gNB beam (SSB beam) is chosen by the UE (i.e. received with highest power). The exact time (RACH occasion) may be likely to be different for each TRP, and hence the UE may transmit several RACH preambles dedicated to each specific TRP, while also keeping relevant UE hardware powered on for the total duration of all target(s) RO(s), which may not be ideal for a UE in idle/inactive or unconnected state.

FIG. 4 is a block diagram of an example system, indicated generally by the reference numeral 40. The system 40 shows a UE 41 with a plurality of panels, such as panels P1 and P2. The system further may include a plurality of network nodes (e.g. gNB/TRP) TRP1 having plurality of beams 42, 43, TRP2 having plurality of beams 44, 45, and TRP3 having plurality of beams 46, 47. The UE 41 may be receiving best SSB beams 43, 44, and 46 from different network nodes/ transmission reception points TRP1, TRP2, and TRP3 respectively, where the beams 43, 44, and 46 may have different SSB index, such that the UE may be required to transmit preamble signals (PRACH preamble) at three different times (RACH occasions). FIG. 5 is an illustration of an example plot 50 for sending channel preamble messages. As seen from plot 50, a first PRACH preamble message is sent to TRP2 at a first RO (RO #1), a second PRACH preamble message is sent to TRP1 at a fourth RO (RO #4), and a third PRACH preamble message is sent to TRP2 at a fifth RO (RO #5).

In a scenario as described with respect to FIGS. 3 to 5, a UE may consume power for sending multiple PRACH preamble messages to multiple TRPs, where the power consumption might be significant when the UE is in idle/ inactive mode, and may cause reduction in battery life. In case the UE is using different panels for different TRPs, there could be hardware limitations (e.g. inter panel switching time) preventing the UE from transmitting in two sequential ROs using different panels, which may cause the total transmission time for transmitting all PRACH preamble messages to further be increased due to increased periodicity of the RO allocation.

In some example embodiments, for UE positioning in idle, unconnected and/or inactive UEs, there may be time delays or beam alignment problems due to the UE being idle and/or inactive. Additionally, or alternatively, a UE may be required to split the preamble signal to different panels of the UE, such that the maximum power level allowed in the current standard (e.g. 23 dBm) may have to be distributed among the panels of the UE, thus reducing the power per panel. Alternatively, or in addition, the UE may reuse the RACH framework, where the UE may send preambles to each base station sequentially on each RACH occasion with a selected panel (e.g. best corresponding panel). However, such sequential PRACH preamble transmissions may cause high power consumption on the UE (e.g. thus being undesirable while the UE is in idle/inactive mode), and/or may cause delays in obtaining positioning estimates.

Some example embodiments described below provide techniques aimed at reducing the number of PRACH transmissions by the UEs, while still being suitable for sending PRACH transmissions to a plurality of base stations for optimal positioning estimation.

Figure 6:
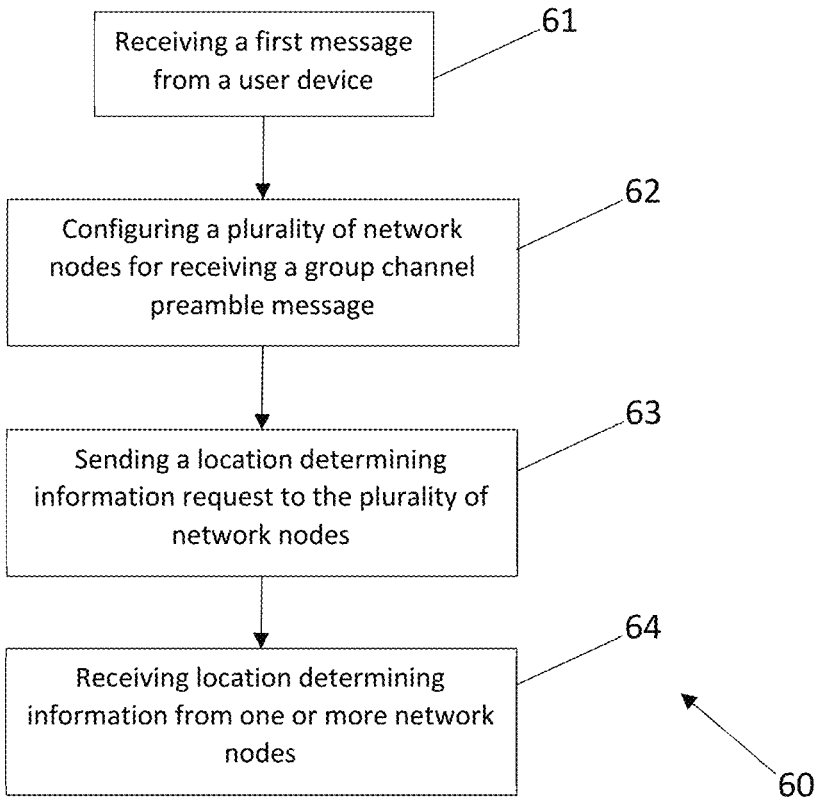
FIG. 6 is a flowchart of an algorithm in accordance with an example embodiment.

FIG. 6 is a flowchart of an algorithm (e.g. a method), indicated generally by the reference numeral 60, in accordance with an example embodiment. The operations of the algorithm 60 may be performed at a positioning module, such as the positioning module 2 (e.g. LMF) as described with reference to FIG. 1.

At operation 61, a first message may be received from a user device, such as the user device 3 (e.g. UE) as described with reference to FIG. 1. The first message may provide an indication that the user device supports group channel preamble message transmission. In some example embodiments, group channel preamble transmission may be used for transmitting, by the user device, a same group channel preamble message (e.g. PRACH preamble message) to a plurality of network nodes (e.g. gNBs or TRPs) in a single RACH occasion, thus allowing a user device in idle/inactive or unconnected state to use minimal power for PRACH transmissions.

Next, at operation 62, a plurality of network nodes, such as network nodes 4a, 4b, and 4c as described with reference to FIG. 1, are configured for receiving a same group channel preamble message (e.g. a positioning preamble message) from said user device. The plurality of network nodes may belong to a network node group. In an example embodiment, selection or determination of which network nodes belong to the network node group may be carried out at the user device (described in further detail below with reference to FIG. 12). In an example embodiment, the plurality of network nodes in the network node group may include network nodes that are suitable for receiving the same group channel preamble message during a single random access channel occasion. In an example embodiment, the same group channel preamble message may comprise a physical random access channel (PRACH) preamble message.

In an example embodiment, the configuring operation may comprise sending a configuration message to each of the plurality of network nodes. In one example, said configuration message may include a first preamble index. For example, the first preamble index may be used by the user device for positioning purposes. The first preamble index may be provided to the network node(s) so as to ensure that the network node(s) understand that the configuration is for PRACH positioning purposes, and the network node(s) do not initiate legacy RACH procedure with other types of messaging (e.g. Msg2, or the like).

In an example embodiment, the configuration message may or may not include information that the PRACH preamble message to be received from the UE is a same group channel preamble message from the UE, or information that the UE supports group channel preamble transmission. As such, the network nodes may be configured in the same way for receiving same group channel preamble messages or for receiving any positioning preamble message, such as generic PRACH preamble messages (e.g. individual PRACH preamble messages based on current standards).

At operation 63, a location determining information request is sent to said plurality of network nodes. As such, the positioning module requests information from the network node(s) that may allow the positioning module to estimate the position of the user device. In an example embodiment, the location determining information request may comprise one or more of a reference signal received power threshold, number of network nodes configured for receiving the same group channel preamble message, identity of network nodes configured for receiving the same group channel preamble message, expected uplink preamble receiving power. Said information comprised within the location determining information request may be conveyed by the network node(s) to the user device, and the user device may use one or more of said information for selecting one or more available network nodes for transmission (e.g. for transmission of the PRACH preamble message). In an example embodiment, one or more of the network nodes (e.g. at least a serving network node) may send a paging message to the user device for obtaining positioning information, where said paging message may include one or more of the above information provided within the location determining information request.

At operation 64, in response to said location determining information request, the positioning module may receive location determining information from one or more of the plurality of network nodes. In one example the location determining information may comprise one or more of time of arrival and angle of arrival relating to said same group channel preamble message received by the respective network node from said user device.

In an example embodiment, the positioning module may determine/estimate the position of said user device based, at least in part, on the received location determining information.

Figure 7:
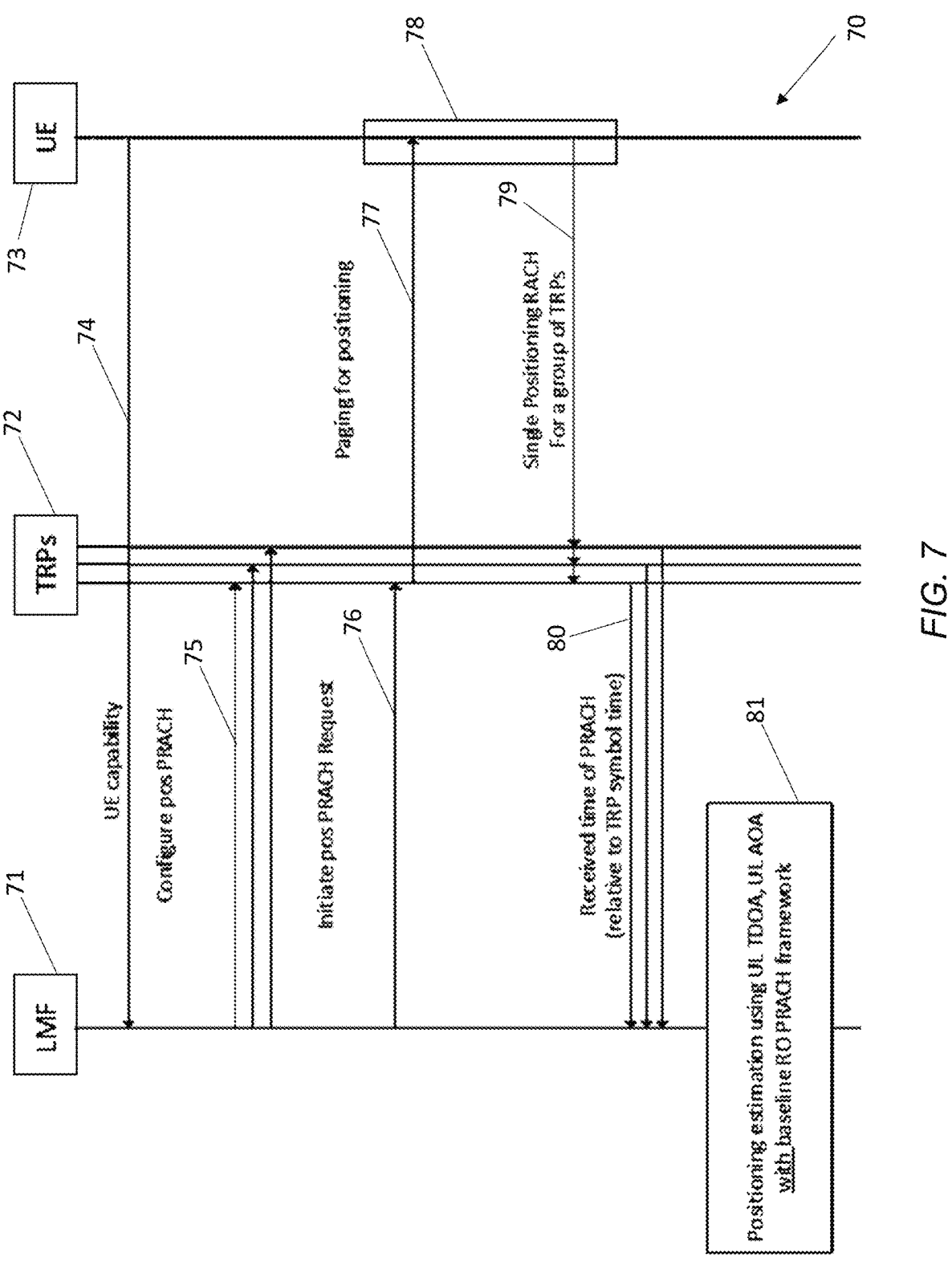
FIG. 7 is a message sequence of an algorithm in accordance with an example embodiment.

FIG. 7 is a message sequence of an algorithm, indicated generally by the reference numeral 70, in accordance with an example embodiment. The message sequence is an example implementation of the algorithm 60.

The algorithm 70 shows a signalling between a positioning module (e.g. LMF) 71, a plurality of network nodes (e.g. TRPs) 72, and a user device (e.g. UE) 73. The algorithm 70 may start with the user device 73 sending a message 74 (e.g. similar to the message received at operation 61) to the positioning module 71, where the message 74 indicates that the user device 73 supports group channel preamble message transmission. For example, message 74 may be an initialization message, where the user device 73 informs a network, including the positioning module 71, that the user device 73 supports enhanced PRACH transmission, such as group PRACH preamble message transmission, for positioning. In one example, information contained in message 74 may be added to existing capability information element (IE) corresponding to the user device 73.

Next, the positioning module 71 may configure (similar to operation 62) one or more of the plurality of network nodes 72, by sending configuration message(s) 75 to configure the network nodes to receive a same group channel preamble message (e.g. positioning preamble message) from the user device 73. For example, the positioning module 71 may configure one or more network nodes to receive positioning PRACH preamble message from one or multiple user devices, such as the user device 73. In one example embodiment, said configuration message may include a first preamble index that may be used by the user device for positioning purposes.

When the positioning module 71 requires a new positioning estimate (e.g. for the user device 72), the positioning module 71 may then send a positioning PRACH request in message 76 (e.g. location determining information request, similar to operation 63) to one or more of the network nodes 72. For example, the message 76 may be sent at least to a serving network node (that is currently serving the user device 73), and may optionally be sent to one or more other network nodes 72. As described earlier, the message 76 may comprise parameters including one or more of a reference signal received power threshold, number of network nodes configured for receiving the same group channel preamble message, identity of network nodes configured for receiving the same group channel preamble message, expected uplink preamble receiving power.

In response to receiving the message 76, one or more of the network nodes 72 (including at least a network node of the serving cell of the user device 73) sends a paging message 77 to the user device 73 for positioning of the user device 73. The number of network nodes 72 requested to transmit the paging message 77 may be dependent upon an area (e.g. registration area) of the user device 73. For example, for user devices near cell edges or located in proximity to a plurality of network nodes, a plurality of network nodes may be requested by the positioning module to send the paging message 77 to the user device 73. In one example, the paging message(s) 77 may include one or more of the parameters provided by the positioning module 71 in message 76.

At operation 78, in response to the paging message(s) 77, the user device 73 may initiate RACH transmission for positioning procedure. This may include the selection of a single RACH occasion for transmission of a same group channel preamble message (PRACH preamble message). The user device 73 may select one or more of the network nodes for transmission of the PRACH preamble message based, at least in part, on the one or more of the parameters provided by the positioning module in message 76, and included in the paging message 77.

The user device 73 may send a same group channel preamble message 79 (PRACH message) during a single RACH occasion, such that the message 79 is received by a group of the selected one or more network nodes 72. Each of the network nodes receiving the message 79 may then estimate one or more of a time of arrival (ToA) or angle of arrival (AoA) associated with the received same group channel preamble message. The network nodes within the group may be synchronised, such that the ToA may be a relative time compared to a downlink symbol start time.

The positioning module 71 may receive, as messages 80, information of the ToA and/or AoA from the plurality of network nodes within the group, such that the positioning module 71 may determine the received time of all the PRACH preambles, and consequently determine time difference of arrival (TDOA). The received time may be relative to symbol times of the network nodes.

At operation 81, the positioning module may determine position of the user device 73 based on the location of the network nodes 72 (typically already known by the positioning module 71), TDOA (e.g. uplink TDOA) and/or AoA (e.g. uplink AoA) associated with the user device 73, received from a plurality of network nodes.

Figure 8:
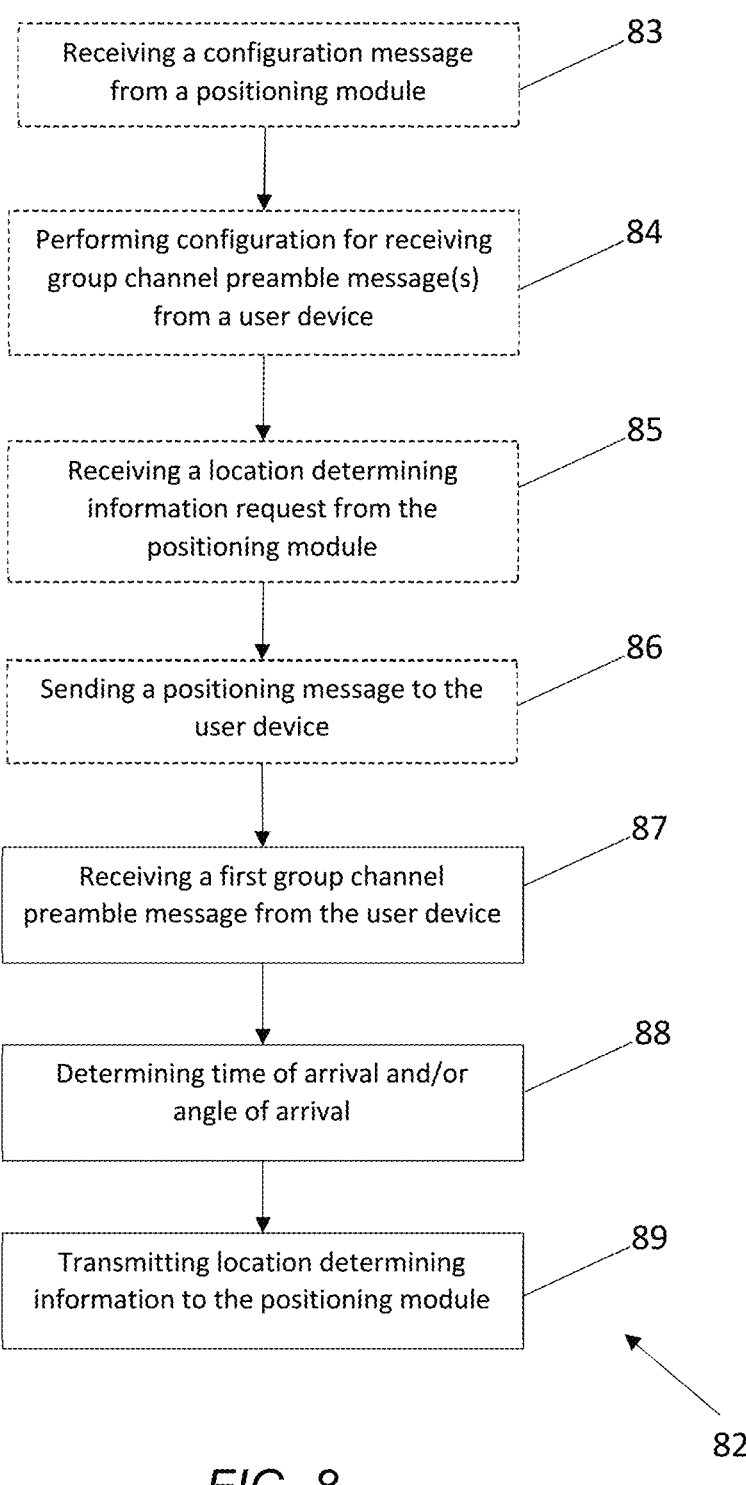

FIG. 8 is a flowchart of an algorithm, indicated generally by the reference numeral 82, in accordance with an example embodiment. The operations of the algorithm 82 may be performed at a first network node, such as network nodes 4*a*, 4*b*, 4*c* (e.g. gNB or TRP) as described with reference to FIG. 1.

The first network node may be a part of a group of network nodes, wherein the group of network nodes are suitable for receiving the same group channel preamble message from the user device at a single random access channel occasion.

In some examples, operations 83, 84, 85, and 86 may be optional, such that they may be omitted from the algorithm 82.

The algorithm 82 starts with operation 83, where a first network node receives a configuration message (e.g. message 75) from a positioning module (e.g. positioning module 1, LMF). Based on the received configuration message, at operation 84, the first network node performs configuration for receiving one or more same group channel preamble messages from a user device (as described with reference to operation 62).

Next, at operation 85, a location determining information request (e.g. message 76) is received from the positioning module (e.g. as sent by the positioning module in operation 63). In response to receiving the location determining information request, the first network node sends, at operation 86, a positioning or paging message (e.g. paging message 77) to the user device based, at least in part, on the received location determining information request. In some example embodiments, operation 86 may be performed by the first network node only when the first network node is a serving network node. In other examples, operation 86 may be omitted for the first network node, and may instead be performed by one or more other network nodes of the first group of network nodes. For example, the operation 86 may be performed by a serving network node (which may be any one of the network nodes of the first group of network nodes).

At operation 87, the first network node receives a same group channel preamble message (e.g. similar to message 79) from the user device. In some examples, the same group channel preamble message may be received in response to a positioning or paging message sent from the network node to the user device. Alternatively, or in addition, the same group channel preamble message may be received by the network node from the user device after the user device receives a positioning or paging message from another network node.

Next, at operation 88, the first network node determines one or more of a time of arrival and an angle of arrival associated with the same group channel preamble message. At operation 89, location determining information, such as the ToA and/or AoA, is transmitted to the positioning module (e.g. message 80). The positioning module may then determine a position of the user device based on said location determining information.

FIG. 9 is a flowchart of an algorithm, indicated generally by the reference numeral 900, in accordance with an example embodiment. The operations of the algorithm 900 may be performed at user device, such as user device 3 (e.g. UE) as described with reference to FIG. 1.

In some examples, operation 910 may be optional, such that the operation 910 may be omitted from the algorithm 900.

The algorithm 900 may start at operation 920, where the user device receives, while the user device still in an inactive, unconnected or idle mode, a paging message for positioning determination from one or more of a plurality of network nodes in a radio network.

At operation 930, the user device transmits a same group channel preamble message dedicated for positioning determination, to a group of network nodes which are selected within a same spatial filter of the user device.

In some example embodiments, prior to the user device receiving the paging message from the one or more of the plurality of network nodes, the user device is caused, at operation 910, to transmit a message indicating that the user device supports group channel preamble transmission to a positioning network node (e.g. positioning module 2, such as LMF).

In some example embodiments, the same group channel preamble message is transmitted under a single random access channel occasion (RO). The same group channel preamble message may comprise a physical random access channel (PRACH) preamble message. The paging message may comprise one or more of: a reference signal received power threshold, number of network nodes configured for receiving the group channel preamble message, identity of network nodes configured for receiving the group channel preamble message, expected uplink preamble receiving power.

FIG. 10 is a flowchart of an algorithm, indicated generally by the reference numeral 90, in accordance with an example embodiment. The operations of the algorithm 90 may be performed at user device, such as user device 3 (e.g. UE) as described with reference to FIG. 1.

The algorithm 90 starts with operation 91, where the user device transmits a first message (e.g. message 74) to a positioning module (e.g. LMF). The first message (e.g. an initialization message) may provide indication that the user device supports group channel preamble message transmission. Next, at operation 92, the user device may receive a positioning message (e.g. paging message 77) from one or more of a plurality of network nodes. At operation 93, the user device determines (e.g. operation 78) a first group of network nodes from the plurality of network nodes that are suitable for receiving a same group channel preamble message. The first group of network nodes may be selected based, at least partially, on parameters provided in the message received at operation 92. At operation 94, a same group channel preamble message is transmitted to the first group of network nodes at a first random access channel occasion. In one example, the first group of network nodes comprise network nodes that are suitable for receiving the same group channel preamble message at a single RO occasion.

FIG. 11 is a flowchart of an algorithm, indicated generally by the reference numeral 100, in accordance with an example embodiment. The algorithm 100 may comprise operations performed for determining (e.g. operation 93) the first group of network nodes.

The algorithm 100 starts at operation 101, where a first network node is selected from the plurality of network nodes. The first network node may be selected based on determining that the highest transmission power level is required for transmission of a channel preamble message to said first network node in comparison with required transmission power levels to other ones of the plurality of network nodes.

At operation 102, the first group of network nodes are determined, where the first group of network nodes are suitable for receiving a same group channel preamble message from the user device during a same random access channel occasion as that of the first network node.

The algorithm 100 may be repeated so that one than one group of network nodes is defined.

Figure 12:
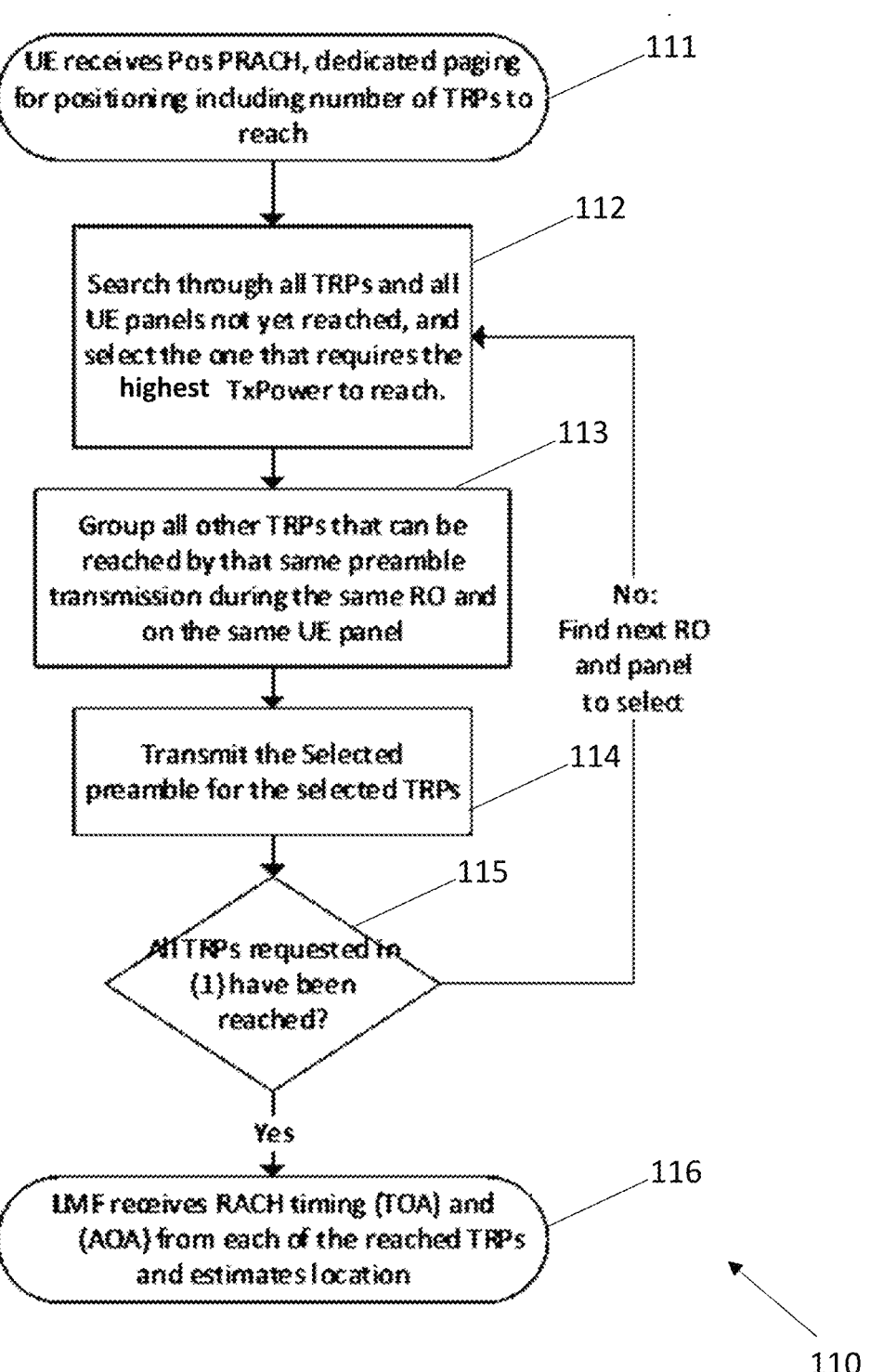

FIG. 12 is a flowchart of an algorithm, indicated generally by the reference numeral 110, in accordance with an example embodiment. The operations of the algorithm 110 may be performed at user device, such as user device 3 (e.g. UE) as described with reference to FIG. 1.

At operation 111, the user device receives a positioning message (e.g. paging message 77) from at least a serving network node (e.g. may receive positioning messages from one or more other network nodes). The positioning message may comprise parameters, such as the number of network nodes (TRPs) that the user device is required to reach and send PRACH preamble message(s). The parameters comprised within the positioning message may be configured by a positioning module (e.g. LMF).

At operation 112, the user device searches through a plurality of available network nodes, for example, using all available panels of the user device. The user device may further select a first network node, where the first network node requires the highest transmission power (at the user device) to be reached and to transmit the PRACH preamble message(s).

At operation 113, the user device determines a same group of network nodes, where the first group of network nodes are selected based on being suitable for receiving a same group channel preamble message (PRACH message) from the user device during a same random access channel occasion as that of the first network node.

At operation 114, the same group channel preamble message is transmitted to the first group of network nodes in a single RACH occasion.

At operation 115, the user device determines whether or not the group channel preamble message has been transmitted to the number of network nodes specified in the parameters of operation 111. If not, the user device may repeat the operations 112 to 114 for transmitting a new same group channel preamble message to another group of network nodes at a different RACH occasion.

If the same group channel preamble message has been transmitted to the number of network nodes specified in the parameters of operation 111, operation 116 is performed at the positioning module for estimating the position of the user device, where the positioning module receives RACH timings (e.g. based on ToA and/or AoA measurements from the network node(s) receiving the PRACH message from the user device).

Figure 13:
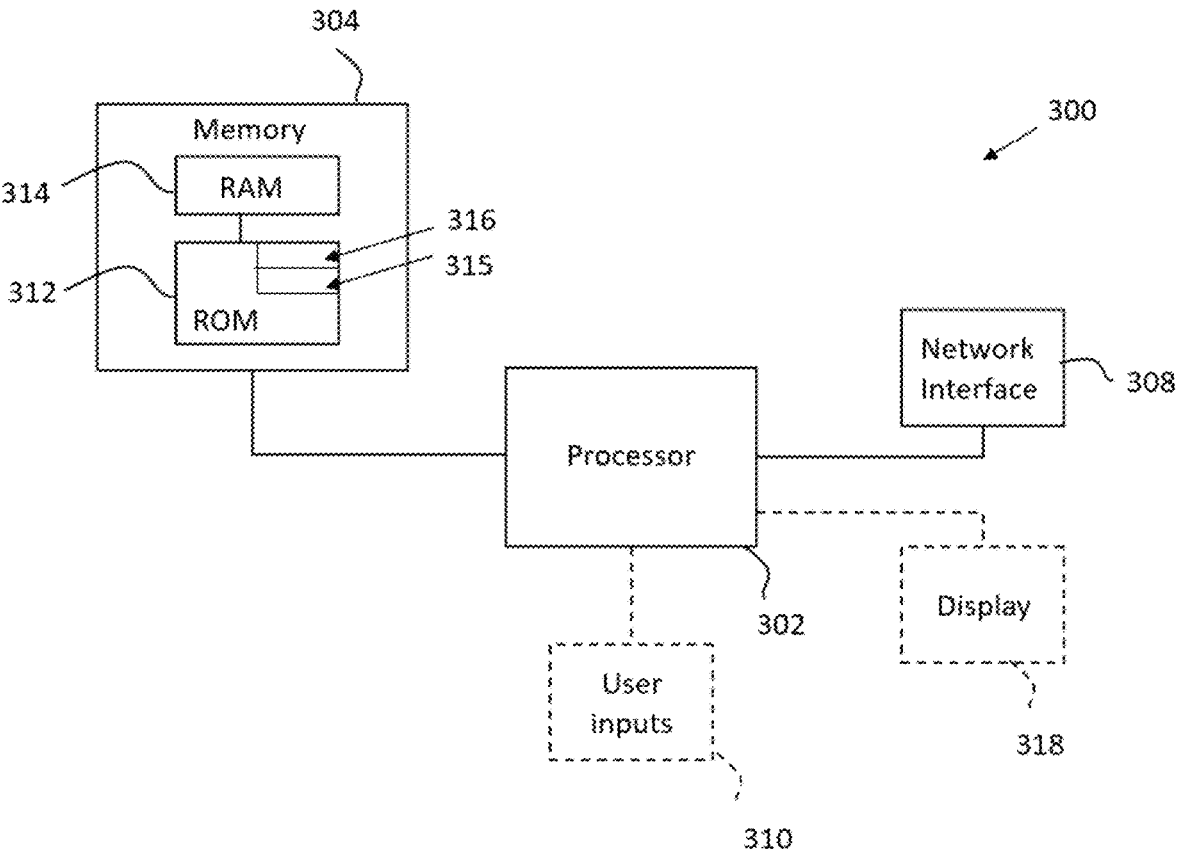
FIG. 13 is a block diagram of components of a system in accordance with an example embodiment.

For completeness, FIG. 13 is a schematic diagram of components of one or more of the example embodiments described previously, which hereafter are referred to generically as processing systems 300. A processing system 300 may have a processor 302, a memory 304 closely coupled to the processor and comprised of a RAM 314 and ROM 312, and, optionally, user input 310 and a display 318. The processing system 300 may comprise one or more network/apparatus interfaces 308 for connection to a network/apparatus, e.g. a modem which may be wired or wireless. Interface 308 may also operate as a connection to other apparatus such as device/apparatus which is not network side apparatus. Thus, direct connection between devices/apparatus without network participation is possible.

The processor 302 is connected to each of the other components in order to control operation thereof.

The memory 304 may comprise a non-volatile memory, such as a hard disk drive (HDD) or a solid-state drive (SSD). The ROM 312 of the memory 304 stores, amongst other things, an operating system 315 and may store software applications 316. The RAM 314 of the memory 304 is used by the processor 302 for the temporary storage of data. The operating system 315 may contain computer program code which, when executed by the processor implements aspects of the algorithms 60, 80, 900, 90, 100, and 110 described above. Note that in the case of small device/apparatus the memory can be most suitable for small size usage i.e. not always hard disk drive (HDD) or solid-state drive (SSD) is used.

The processor 302 may take any suitable form. For instance, it may be a microcontroller, a plurality of microcontrollers, a processor, or a plurality of processors.

The processing system 300 may be a standalone computer, a server, a console, or a network thereof. The processing system 300 and needed structural parts may be all inside device/apparatus such as IoT device/apparatus i.e. embedded to very small size In some example embodiments, the processing system 300 may also be associated with external software applications. These may be applications stored on a remote server device/apparatus and may run partly or exclusively on the remote server device/apparatus. These applications may be termed cloud-hosted applications. The processing system 300 may be in communication with the remote server device/apparatus in order to utilize the software application stored there.

Figure 14:
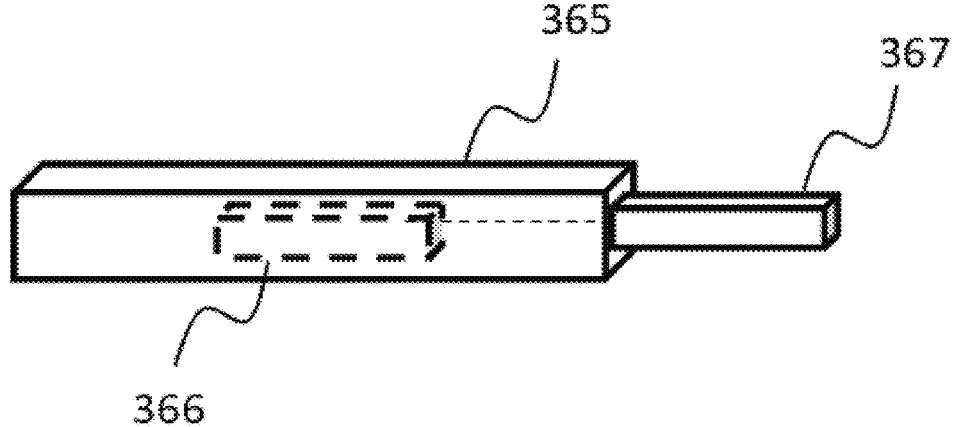
FIG. 14 shows an example of tangible media for storing computer-readable code which when run by a computer may perform methods according to example embodiments described above.

FIG. 14 shows tangible media, specifically a removable memory unit 365, storing computer-readable code which when run by a computer may perform methods according to example embodiments described above. The removable memory unit 365 may be a memory stick, e.g. a USB memory stick, having internal memory 366 for storing the computer-readable code. The internal memory 366 may be accessed by a computer system via a connector 367. Other forms of tangible storage media may be used. Tangible media can be any device/apparatus capable of storing data/information which data/information can be exchanged between devices/apparatus/network.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable storage medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices/apparatus and other devices/apparatus. References to computer program, instructions, code etc. should be understood to express software for a programmable processor firmware such as the programmable content of a hardware device/apparatus as instructions for a processor or configured or configuration settings for a fixed function device/apparatus, gate array, programmable logic device/apparatus, etc.

As used in this application, the term "circuitry" refers to all of the following: (a) hardware-only circuit implementations (such as implementations in only analogue and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a server, to perform various functions) and (c) to circuits, such as a microprocessor(s) or a portion of a microprocessor(s), that require software or firmware for operation, even if the software or firmware is not physically present.

If desired, the different functions discussed herein may be performed in a different order and/or concurrently with each other. Furthermore, if desired, one or more of the above-described functions may be optional or may be combined. Similarly, it will also be appreciated that the flow chart of FIGS. 6, 8 to 12, and message sequence of FIG. 7, is an example only and that various operations depicted therein may be omitted, reordered and/or combined.

It will be appreciated that the above described example embodiments are purely illustrative and are not limiting on the scope of the invention. Other variations and modifications will be apparent to persons skilled in the art upon reading the present specification. In another embodiment, the user device may be in a connected state with the radio network (instead of idle/unconnected or inactive state) when performing the described steps of the disclosure.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

The invention claimed is:

1. A user device, comprising:
    at least one processor; and
    at least one memory storing instructions that, when executed by the at least one processor, cause the user device at least to:
        transmit a message to a positioning network node indicating that the user device supports group channel preamble transmission;

receive, while the user device still in a radio resource control (RRC) inactive, unconnected or idle mode, a paging message for positioning determination from one or more of a plurality of network nodes in a radio network, wherein the paging message comprises:
    a reference signal received power (RSRP) threshold,
    a number of network nodes configured for receiving a group channel preamble message,
    an identity of network nodes configured for receiving the group channel preamble message, and
    an expected uplink preamble receiving power; and transmit a same group channel preamble message dedicated for positioning determination to a group of network nodes which are selected by the user device from the plurality of network nodes, wherein the group of network nodes are configured to receive a location determining information request from a positioning module in communication with the user device, wherein the location determining information request includes:
    a time of arrival associated with the same group channel preamble message, and
    an angle of arrival associated with the same group channel preamble message, wherein the group of network nodes are synchronized, such that the time of arrival associated with the same group channel preamble message is a relative time compared to a downlink symbol start time, wherein the same group channel preamble message is transmitted under a single random access channel occasion (RO), wherein the same group channel preamble message comprises a physical random access channel (PRACH) preamble message, wherein the group of network nodes are selected within a same transmit spatial filter of the user device, wherein the positioning module is a location management function (LMF) module, and wherein the positioning module is configured to determine a position of the user device based on location determining information.

* * * * *